(12) United States Patent
Shankar et al.

(10) Patent No.: US 9,276,478 B2
(45) Date of Patent: Mar. 1, 2016

(54) ACTIVE FORWARD MODE RECTIFIER

(71) Applicant: SunEdison LLC, Beltsville, MD (US)

(72) Inventors: Jayaraman Vijay Shankar, San Jose, CA (US); Suryanarayana Potharaju, San Jose, CA (US)

( * ) Notice: Subject to any disclaimer, the term of this patent is extended or adjusted under 35 U.S.C. 154(b) by 140 days.

(21) Appl. No.: 14/142,334

(22) Filed: Dec. 27, 2013

(65) Prior Publication Data

US 2014/0185331 A1 Jul. 3, 2014

Related U.S. Application Data

(60) Provisional application No. 61/747,162, filed on Dec. 28, 2012.

(51) Int. Cl.
*H02M 7/06* (2006.01)
*H02M 3/28* (2006.01)

(52) U.S. Cl.
CPC . *H02M 3/28* (2013.01); *H02M 7/06* (2013.01)

(58) Field of Classification Search
CPC ......... H02M 1/32; H02M 3/335; H02M 7/06; H02M 7/066; H02H 7/125
USPC ................................ 363/50, 52, 53, 125, 126
See application file for complete search history.

(56) References Cited

U.S. PATENT DOCUMENTS

| 4,109,306 | A  | * | 8/1978  | Mason          | 363/61        |
|-----------|----|---|---------|----------------|---------------|
| 4,471,423 | A  | * | 9/1984  | Hase           | 363/90        |
| 5,422,804 | A  | * | 6/1995  | Clark          | 363/44        |
| 5,923,547 | A  | * | 7/1999  | Mao            | 363/52        |
| 6,304,461 | B1 | * | 10/2001 | Walker         | H02M 3/33584  |
|           |    |   |         |                | 363/127       |
| 6,532,160 | B2 | * | 3/2003  | Hirokawa et al.| 363/52        |
| 8,193,788 | B2 | * | 6/2012  | Chapman        | 323/259       |

* cited by examiner

*Primary Examiner* — Gary L Laxton
(74) *Attorney, Agent, or Firm* — Armstrong Teasdale LLP

(57) ABSTRACT

A power converter includes a transformer having a primary winding and a secondary winding, a primary side circuit coupled to the primary winding, and a secondary side circuit coupled to the secondary winding and configured to output a substantially direct current (DC) output. The primary side circuit is configured to receive an input voltage and to switch the input voltage across the primary winding of the transformer. The secondary side circuit includes an active forward mode rectifier.

10 Claims, 11 Drawing Sheets

ACTIVE FORWARD MODE RECTIFIER

CROSS REFERENCE TO RELATED APPLICATIONS

This application claims priority to U.S. Patent Application Ser. No. 61/747,162, filed Dec. 28, 2012, which is hereby incorporated by reference in its entirety.

FIELD

The field of this disclosure relates generally to rectifiers, and more specifically to active forward mode rectifiers for power converters in photovoltaic (PV) systems.

BACKGROUND

In push-pull type power converters (e.g., push-pull, half bridge, and full bridge converters), non-linearity in output current is exhibited due to magnetizing current flowing through output rectifier diodes and magnetizing energy being not utilized for zero voltage switching (ZVS) clamping of the power converter's primary switch. FIGS. 12-15 are diagrams of some known rectifiers for push-pull type converters. More specifically, FIG. 12 is a center tapped full bridge bipolar output rectifier, FIG. 13 is a center tapped full wave positive rectifier, FIG. 14 is a center tapped full wave negatively clamped rectifier, and FIG. 15 is a center tapped full wave negative voltage rectifier. In some known rectifiers, the rectifier diodes compensate and discharge the magnetizing component of the transformer current and the diodes are utilized for freewheeling of the inductors. The diode losses are relatively high and the output current is non-linear with respect to the input modulation on the transformer.

SUMMARY

According to one aspect, a power converter includes a transformer having a primary winding and a secondary winding, a primary side circuit coupled to the primary winding, and a secondary side circuit coupled to the secondary winding and configured to output a substantially direct current (DC) output. The primary side circuit is configured to receive an input voltage and to switch the input voltage across the primary winding of the transformer. The secondary side circuit includes an active forward mode rectifier.

Another aspect of the present disclosure is a photovoltaic (PV) power system including a PV module and a power converter. The power converter is coupled to the PV module to receive an input voltage from the PV module. The power converter includes a transformer having a primary winding and a secondary winding, a primary side circuit coupled to the primary winding, and a secondary side circuit coupled to the secondary winding and configured to output a substantially direct current (DC) output. The primary side circuit is configured to receive the input voltage and to switch the input voltage across the primary winding of the transformer. The secondary side circuit includes an active forward mode rectifier.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Like reference symbols in the various drawings indicate like elements.

DETAILED DESCRIPTION

The embodiments described herein generally relate to rectifiers. More specifically, the described embodiments relate to active forward mode rectifiers for power converters in photovoltaic (PV) systems.

Figure 1:
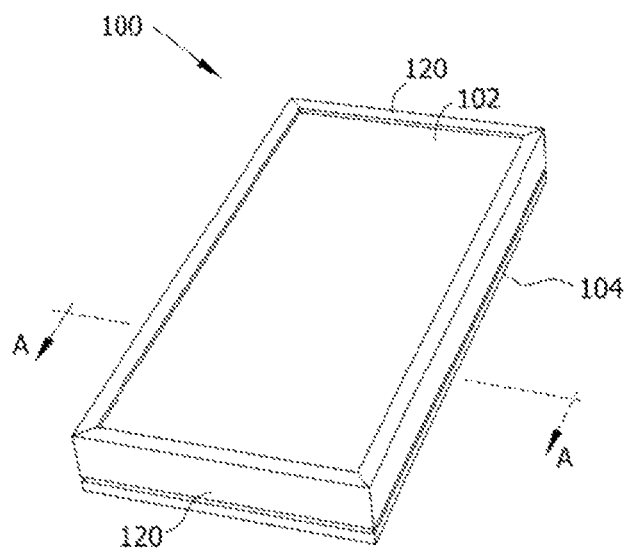
FIG. 1 is a perspective view of an example photovoltaic (PV) module.
Figure 2:
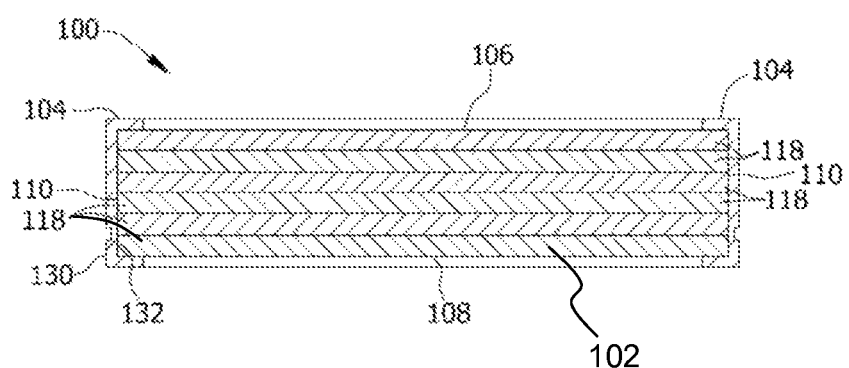
FIG. 2 is a cross-sectional view of the PV module shown in FIG. 1 taken along the line A-A.

Referring initially to FIGS. 1 and 2, a PV module is indicated generally at 100. A perspective view of the PV module 100 is shown in FIG. 1. FIG. 2 is a cross sectional view of the PV module 100 taken at line A-A shown in FIG. 1. The PV module 100 includes a solar laminate 102 (also referred to as a PV laminate) and a frame 104 circumscribing the solar laminate 102.

The solar laminate 102 includes a top surface 106 and a bottom surface 108 (shown in FIG. 2). Edges 110 extend between the top surface 106 and the bottom surface 108. In this embodiment, the solar laminate 102 is rectangular shaped. In other embodiments, the solar laminate 102 may have any suitable shape.

As shown in FIG. 2, the solar laminate 102 has a laminate structure that includes several layers 118. Layers 118 may include for example glass layers, non-reflective layers, electrical connection layers, n-type silicon layers, p-type silicon layers, and/or backing layers. In other embodiments, solar laminate 102 may have more or fewer layers 118, including only one layer, or may have different layers 118, and/or may have different types of layers 118. The solar laminate 102 includes a plurality of solar cells (not shown), each of which converts solar energy to electrical energy. The outputs of the solar cells are connected in series and/or parallel to produce the desired output voltage and current for the solar laminate 102.

As shown in FIG. 1, the frame 104 circumscribes the solar laminate 102. The frame 104 is coupled to the solar laminate 102, as best seen in FIG. 2. The frame 104 assists in protecting the edges 110 of the solar laminate 102. In this embodiment, the frame 104 is constructed of four frame members 120. In other embodiments the frame 104 may include more or fewer frame members 120.

This frame 104 includes an outer surface 130 spaced apart from solar laminate 102 and an inner surface 132 adjacent solar laminate 102. The outer surface 130 is spaced apart from and substantially parallel to the inner surface 132. In this embodiment, the frame 104 is made of aluminum. More particularly, in some embodiments the frame 104 is made of 6000 series anodized aluminum. In other embodiments, the frame 104 may be made of any other suitable material providing sufficient rigidity including, for example, rolled or stamped stainless steel, plastic, or carbon fiber.

Figure 3:
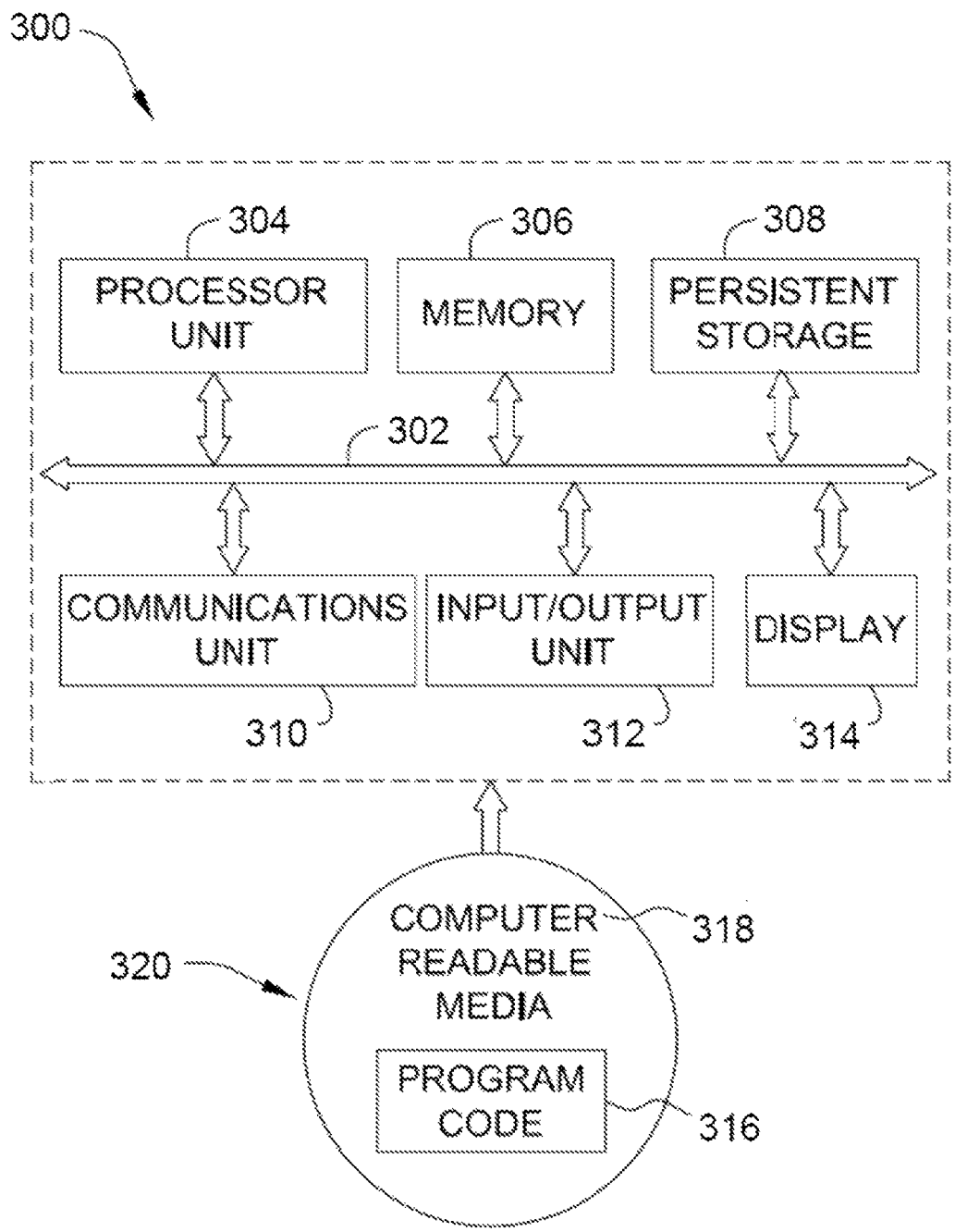
FIG. 3 is a block diagram of an example computing device.

Some exemplary methods and systems are performed using and/or include computing devices. FIG. 3 is a block diagram of an exemplary computing device 300 that may be used. In the exemplary implementation, computing device 300 includes communications fabric 302 that provides communications between a processor unit 304, a memory 306, persistent storage 308, a communications unit 310, an input/output (I/O) unit 312, and a presentation interface, such as a display 314. In addition to, or in alternative to, the presentation interface may include an audio device (not shown) and/or any device capable of conveying information to a user. In some embodiments, computing device 300 is a simpler computing device 300 that does not include one or more of the components of computing device 300 described herein.

Processor unit 304 executes instructions for software that may be loaded into a storage device (e.g., memory 306). Processor unit 304 may be a set of one or more processors or may include multiple processor cores, depending on the particular implementation. Further, processor unit 304 may be implemented using one or more heterogeneous processor systems in which a main processor is present with secondary processors on a single chip. In another implementation, processor unit 304 may be a homogeneous processor system containing multiple processors of the same type. It should be understood that the terms "processor" and "processor unit" refer generally to any programmable system including systems and microcontrollers, reduced instruction set circuits (RISC), application specific integrated circuits (ASIC), programmable logic circuits, and any other circuit or processor capable of executing the functions described herein. The above examples are exemplary only, and thus are not intended to limit in any way the definition and/or meaning of the term "processor" or "processor unit."

Memory 306 and persistent storage 308 are examples of storage devices. As used herein, a storage device is any tangible piece of hardware that is capable of storing information either on a temporary basis and/or a permanent basis. Memory 306 may be, for example, without limitation, random access memory (RAM) such as dynamic RAM (DRAM) or static RAM (SRAM), read-only memory (ROM), erasable programmable read-only memory (EPROM), electrically erasable programmable read-only memory (EEPROM), non-volatile RAM (NVRAM), and/or any other suitable volatile or non-volatile storage device. Persistent storage 308 may take various forms depending on the particular implementation, and persistent storage 308 may contain one or more components or devices. For example, persistent storage 308 may be one or more hard drives, flash memory, rewritable optical disks, rewritable magnetic tapes, and/or some combination of the above. The media used by persistent storage 308 also may be removable. For example, without limitation, a removable hard drive may be used for persistent storage 308.

A storage device, such as memory 306 and/or persistent storage 308, may be configured to store data for use with the processes described herein. For example, a storage device may store (e.g., have embodied thereon) computer-executable instructions, executable software components, PV system component data, PV system layouts, installation instructions, work orders, and/or any other information suitable for use with the methods described herein. When executed by a processor (e.g., processor unit 304), such computer-executable instructions and/or components cause the processor to perform one or more of the operations described herein.

Communications unit 310, in these examples, provides for communications with other computing devices or systems. In the exemplary implementation, communications unit 310 is a network interface card. Communications unit 310 may provide communications through the use of either or both physical and wireless communication links. Communication unit 310 provides communication to one or more element of the PV system.

Input/output unit 312 enables input and output of data with other devices that may be connected to computing device 300. For example, without limitation, input/output unit 312 may provide a connection for user input through a user input device, such as a keyboard and/or a mouse. Further, input/output unit 312 may send output to a printer. Display 314 provides a mechanism to display information, such as any information described herein, to a user. For example, a presentation interface such as display 314 may display a graphical user interface, such as those described herein. The communication device 310 may include one or more analog I/O.

Instructions for the operating system and applications or programs are located on persistent storage 308. These instructions may be loaded into memory 306 for execution by processor unit 304. The processes of the different implementations may be performed by processor unit 304 using computer implemented instructions and/or computer-executable instructions, which may be located in a memory, such as memory 306. These instructions are referred to herein as program code (e.g., object code and/or source code) that may be read and executed by a processor in processor unit 304. The program code in the different implementations may be embodied in a non-transitory form on different physical or tangible computer-readable media, such as memory 306 or persistent storage 308.

Program code 316 is located in a functional form on non-transitory computer-readable media 318 that is selectively removable and may be loaded onto or transferred to computing device 300 for execution by processor unit 304. Program code 316 and computer-readable media 318 form computer program product 320 in these examples. In one example, computer-readable media 318 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, computer-readable media 318 also may take the form of a persistent storage, such as a hard drive, a thumb drive, or a flash memory that is connected to computing device 300. The tangible form of computer-readable media 318 is also referred to as computer recordable storage media. In some instances, computer-readable media 318 may not be removable.

Alternatively, program code 316 may be transferred to computing device 300 from computer-readable media 318 through a communications link to communications unit 310 and/or through a connection to input/output unit 312. The communications link and/or the connection may be physical or wireless in the illustrative examples. The computer-readable media also may take the form of non-tangible media, such as communications links or wireless transmissions containing the program code.

In some illustrative implementations, program code 316 may be downloaded over a network to persistent storage 308 from another computing device or computer system for use within computing device 300. For instance, program code stored in a computer-readable storage medium in a server computing device may be downloaded over a network from the server to computing device 300. The computing device providing program code 316 may be a server computer, a workstation, a client computer, or some other device capable of storing and transmitting program code 316.

Program code 316 may be organized into computer-executable components that are functionally related. Each component may include computer-executable instructions that, when executed by processor unit 304, cause processor unit 304 to perform one or more of the operations described herein.

The different components illustrated herein for computing device 300 are not meant to provide architectural limitations to the manner in which different implementations may be implemented. The different illustrative implementations may be implemented in a computer system including components in addition to or in place of those illustrated for computing device 300. For example, in some embodiments, computing device includes a global positioning system (GPS) receiver. Moreover, components shown in FIG. 3 can be varied from the illustrative examples shown and more or fewer components may be included. As one example, a storage device in computing device 300 is any hardware apparatus that may store data. Memory 306, persistent storage 308 and computer-readable media 318 are examples of storage devices in a tangible form.

In another example, a bus system may be used to implement communications fabric 302 and may include one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 306 or a cache such as that found in an interface and memory controller hub that may be present in communications fabric 302.

Figure 4:
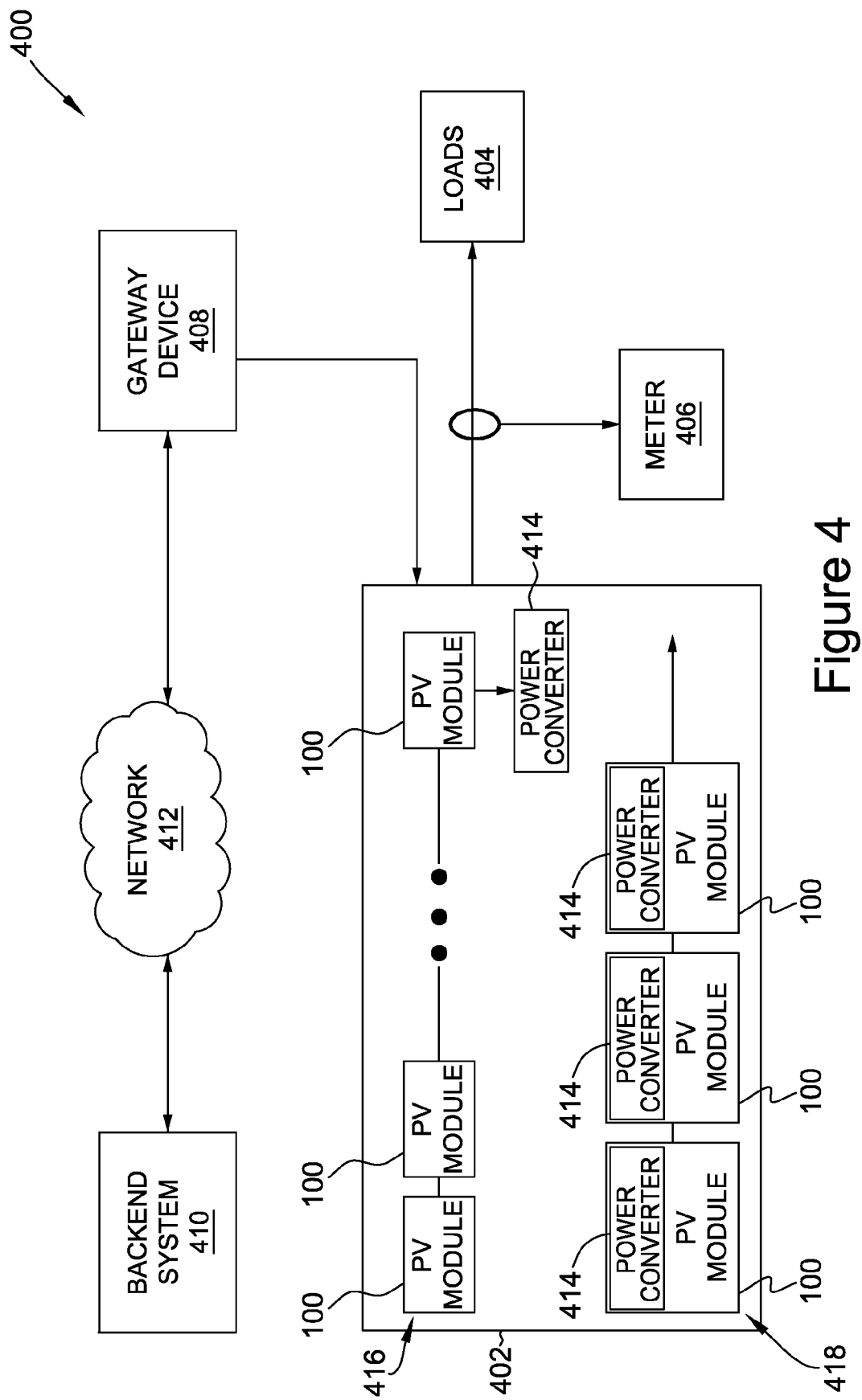
FIG. 4 is a block diagram of an example PV system.

FIG. 4 is a block diagram of an exemplary PV system 400. The PV system 400 includes an array 402 of PV modules 100 and one or more power converters 414. In the exemplary embodiment, the power converters 414 are direct current (DC) to alternating current (AC) power converters (i.e., inverters 414) and the array 402 outputs AC power to one or more loads 404. Alternatively, the power converters 414 are DC to DC power converters and the array 402 outputs DC power to the one or more loads 404. Moreover, in some embodiments, the power converters 414 are multi-stage power converters including at least one DC to DC power converter (regardless of whether the final stage outputs DC or AC power).

In the exemplary embodiment, system 400 is a grid-tied system and load 404 is an electric distribution grid. Alternatively, loads 404 may be any other suitable loads. A meter 406 measures the power delivered to the loads 404. A gateway device 408, also referred to as a data acquisition device, a data logger, or a data acquisition system (DAS), monitors the array 402 and transmits data collected from the array 402 to a backend system 410 via a network 412. Backend system 410 includes one or more computing devices 300. Backend system 410 is usually located at a second location physically separated from the first location at which PV system 400 is located. Alternatively, the second system may be located at the same site as the PV system 400. Moreover, the gateway device 408 may provide information to and communicate with more than one backend systems 410. The distance between the first location and the second location will vary among installed PV systems 400. In some embodiments, the first location and the second location are greater than five miles apart. In other embodiments, the first and second locations are more than ten miles apart, 25 miles apart, 50 miles apart, 100 miles apart, 200 miles apart, or even located on different continents.

The array 402 may be any suitable array of PV modules 100 and one or more inverters 414. For example, the array 402 may include a plurality of PV modules arranged in a string 416 of PV modules 100. Each string of modules is connected to a single inverter 414 to convert the DC output of the string of PV modules to an AC output. Alternatively, or additionally, each PV module 100 in a string 418 may be coupled to its own inverter 414 (sometimes referred to as a microinverter) positioned near or on the PV module to which it is electrically coupled. In still other examples, a plurality of strings of PV modules may be connected, directly or through one or more string combiners, to a single inverter 414, sometimes referred to as a central or string inverter. In addition to converting the DC output of modules 100 to an AC output, inverters 414 perform, for example, MPPT for one or more PV module 100. The inverters 414 may include any suitable number of stages, including one or more DC to DC power converter stage. The inverters (and the one or more stages of the inverters 414) may include any suitable power converter topology, including push-pull converters, half-bridge converters, full, bridge converters, flyback converters, buck converters, boost converters, etc.)

In embodiments that do not include microinverters, the array 402 may include a direct current power manager (DCPM) coupled to each PV module. The DCPM performs, for example, maximum power point tracking (MPPT) for the PV module. It may also selectively control (i.e., limit and/or increase) the maximum power output of the PV module and/or control the conduction of bypass diodes based on temperature and bypass current. The DCPM may also translate the output I-V curve of the PV module to a new I-V curve at which the output voltage does not vary with ambient temperature.

In some embodiments, the array 402 includes one or more tracking devices configured to selectively position the PV modules relative to the sun to attempt to maximize the solar energy incident on the PV modules over time. Any other suitable arrangement of PV modules and inverter(s) may be used, including combinations of the arrangements described above.

The gateway device 408 collects data concerning array 402, such as via one or more sensors (not shown). The gateway device 408 is and/or includes a computing device, such as computing device 300. The collected data may include any appropriate operational, situational, environmental, or other data related to the operation and/or condition of the array 402. For example, the gateway may monitor the ambient air temperature around the array 402, the amount of sunlight incident on the array 402 (or one or more PV module), the output voltage and current of the array 402, the output voltage and current of each PV module, the output voltage and current of each inverter and/or microinverter 414, the surface temperature of the PV modules 100, etc. Moreover, in some embodiments, the gateway device 408 is in communication with one or more components of the array 402. For example, the gateway device 408 may be in communication with one or more inverters 414 in the array 402. Each inverter 414 may provide the gateway device 408 with, for example, its input voltage, its input current, its output voltage, its output current, etc. In some embodiments, the array 402 (and more particularly the inverters 414) may be controlled via the gateway device 408.

In one example, the network 412 is the Internet. In other implementations, network 412 is any other suitable communication network, including, for example, a wide area network (WAN), a local area network (LAN), a cellular network, etc. Network 412 may include more than one network. For example, gateway device 408 may connect to the Internet through one or more other networks and/or interfaces, such as a local area network (LAN), a wide area network (WAN), a home area network (HAN), dial-in-connections, cable modems, and high-speed ISDN lines.

Figure 5:
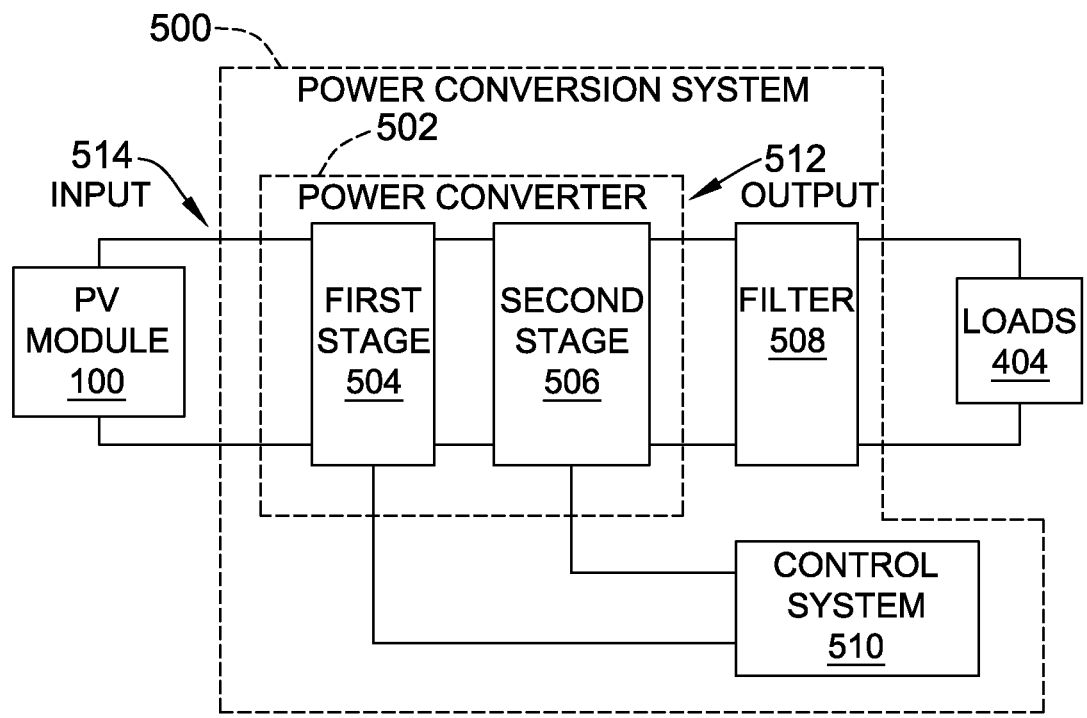
FIG. 5 is a block diagram of an example power converter for use in the system shown in FIG. 4.

FIG. 5 is a block diagram of an example power conversion system 500 suitable for use as a power converter 414 in PV system 400 (shown in FIG. 4). In an exemplary embodiment, power conversion system 500 includes a power converter 502 to convert DC power received from a power source (such as one or more PV modules 100) to an AC output. In other embodiments, power converter 502 may output DC power. The exemplary power converter 502 is a two stage power converter including a first stage 504 and a second stage 506. First stage 504 is a DC to DC power converter that receives a DC power input from power source 102 and outputs DC power to second stage 506. Second stage 506 is a DC to AC power converter (sometimes referred to as an inverter) that converts DC power received from first stage 504 to an AC power output. In other embodiments, power converter 502 may include more or fewer stages. More particularly, in some embodiments power converter 502 includes only second stage 506.

Power conversion system 500 also includes a filter 508, and a control system 510 that controls the operation of first stage 504 and second stage 506. Control system 510 is sometimes referred to herein as a controller. In some embodiments, control system 510 comprises computing device 300. Alternatively, control system 510 may include any suitable combination of analog components, digital components, integrated circuits, and/or discrete components suitable for operation as described herein. An output 512 of power converter 502 is coupled to filter 508. In an exemplary embodiment, filter 508 is coupled to an electrical distribution network (not shown), such as a power grid of a utility company. Accordingly, power converter 502 may be referred to as a grid tied inverter. In other embodiments, power converter 502 may be coupled to any other suitable load.

During operation, the power source generates a substantially direct current (DC), and a DC voltage is generated across input 514. The DC voltage and current are supplied to power converter 502. In an exemplary embodiment, control system 510 controls first stage 504 to convert the DC voltage and current to a substantially rectified DC voltage and current. The DC voltage and current output by first stage 504 may have different characteristics than the DC voltage and current received by first stage 504. For example, the magnitude of the voltage and/or current may be different. Moreover, in the exemplary embodiment, first stage 504 is an isolated converter, which operates, among other things, to isolate the power source from the remainder of power conversion system 500 and the electrical distribution network. The DC voltage and current output by first stage 504 are input to second stage 506. Control system 510 controls second stage 506 to produce AC voltage and current, and to adjust a frequency, a phase, an amplitude, and/or any other characteristic of the AC voltage and/or current to match the electrical distribution network characteristics. The adjusted AC voltage and/or current are transmitted to filter 508 for removing one or more undesired characteristics from the AC voltage and/or current, such as undesired frequency components and/or undesired voltage and/or current ripples. The filtered AC voltage and/or current are then supplied to the electrical distribution network.

Figure 6:
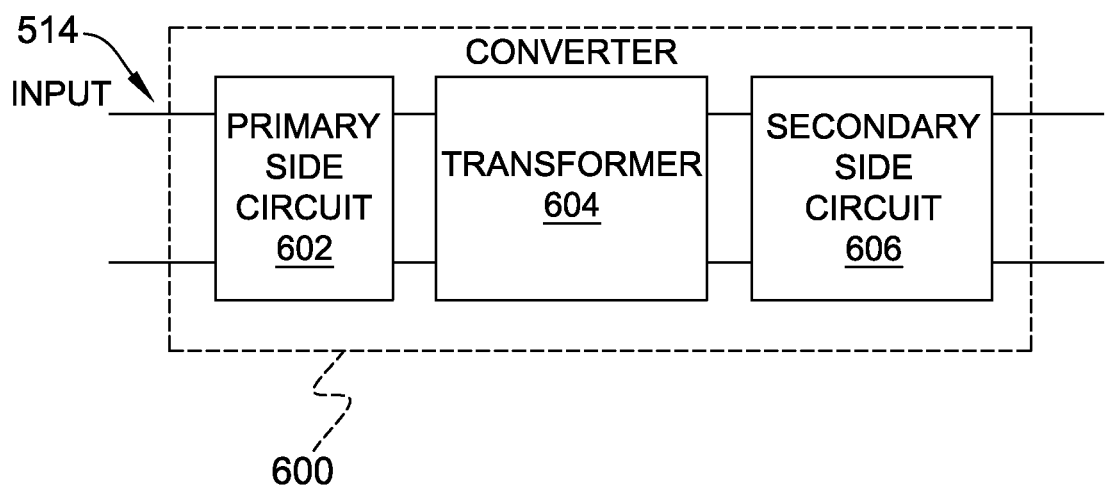
FIG. 6 is a block diagram of an example DC/DC converter for use in the power converter shown in FIG. 5.
Figure 7:
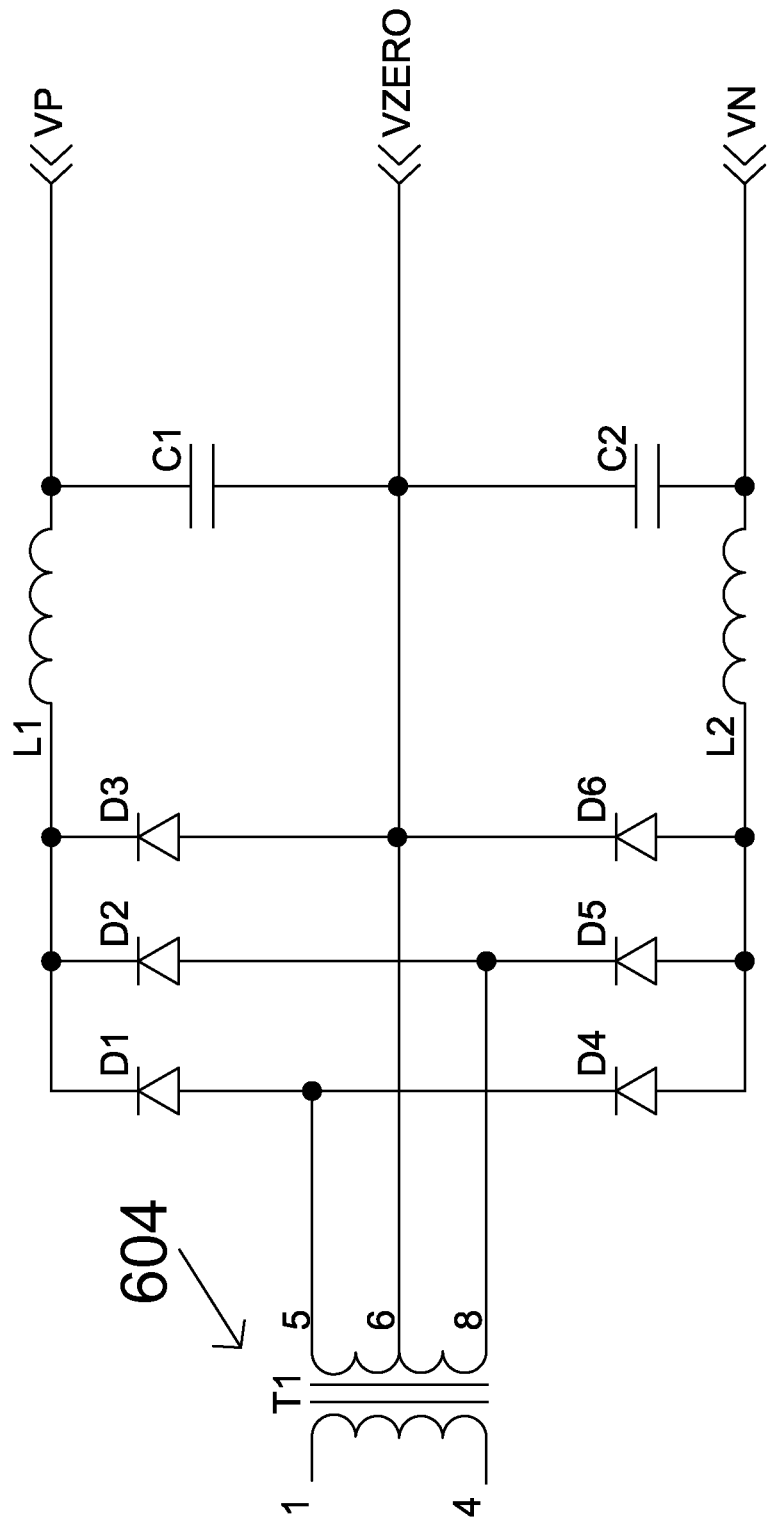
FIG. 7 is a center tapped full bridge active forward mode rectifier.
Figure 8:
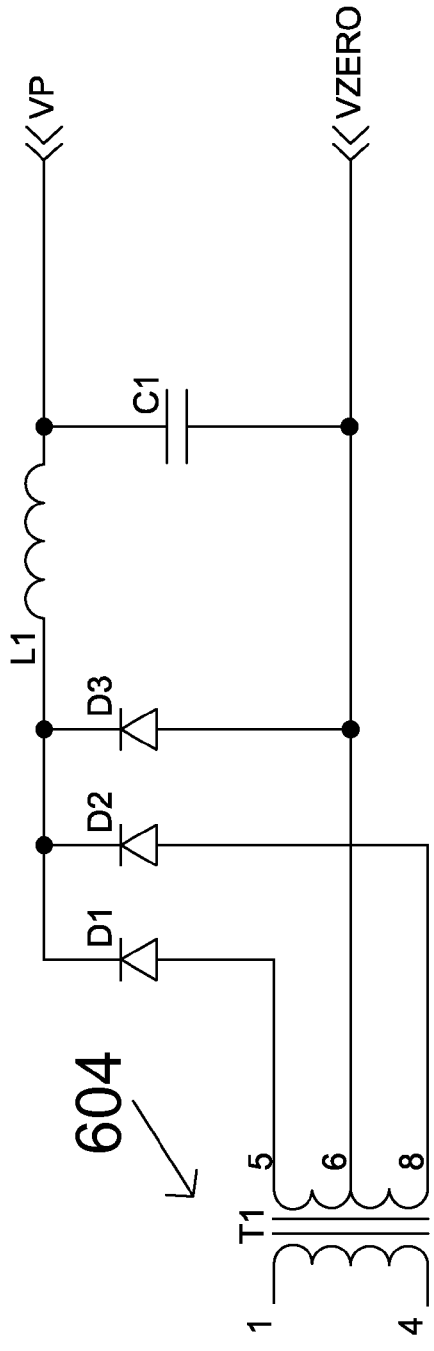
FIG. 8 is a center tapped active forward mode positive rectifier.
Figure 9:
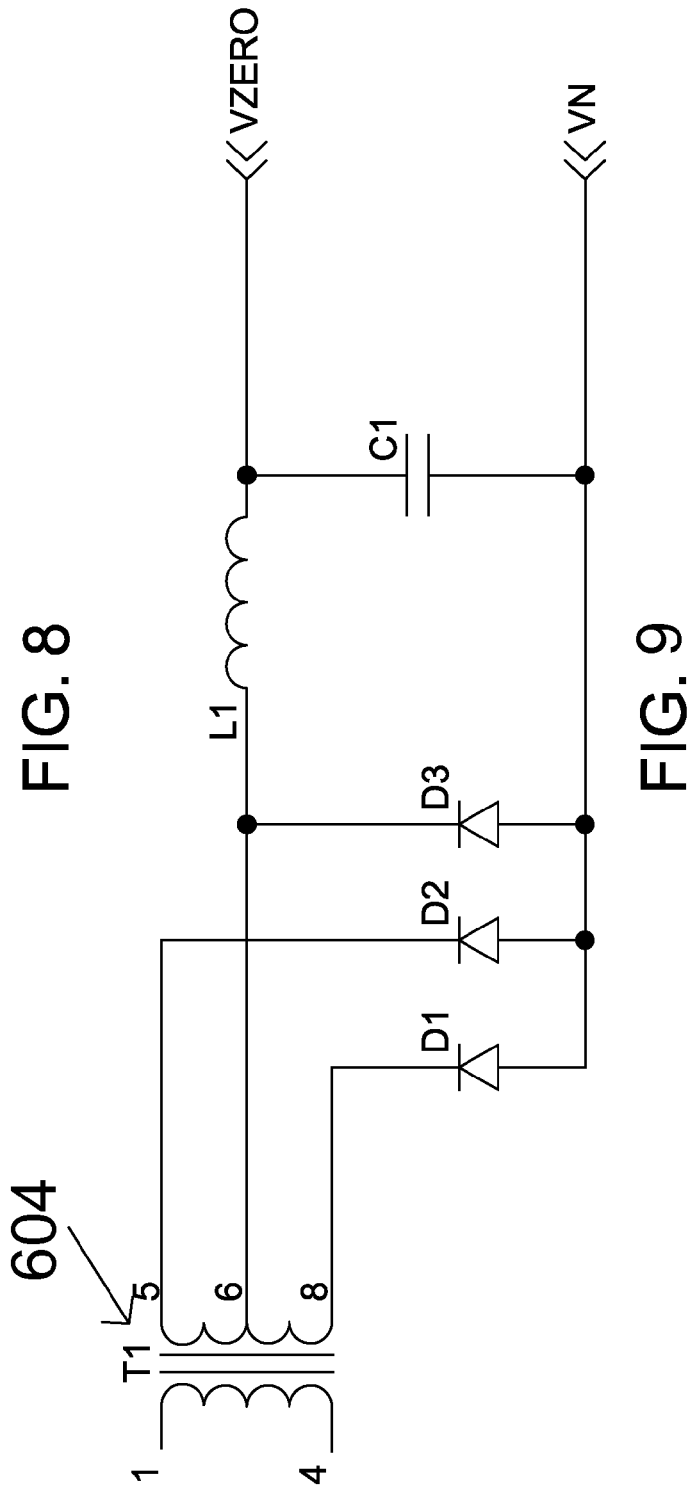
FIG. 9 is a center tapped full wave active forward mode negatively clamped rectifier.
Figure 10:
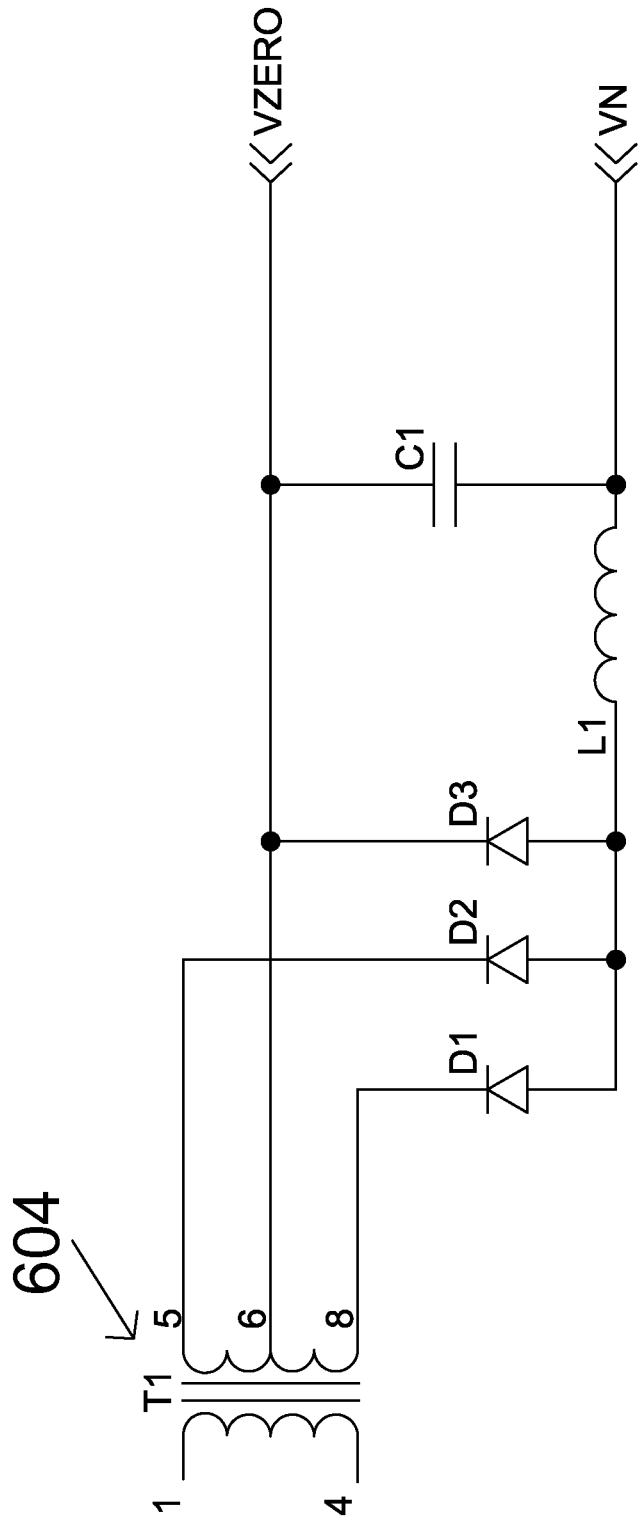
FIG. 10 is a center tapped full wave active forward mode negative voltage rectifier.

FIG. 6 is a block diagram of an exemplary isolated converter 600 for use as first stage 504. Converter 600 includes a primary side circuit 602, a transformer 604, and a secondary side circuit 606. The primary side circuit 602 is coupled to the primary side winding(s) of the transformer 604 and secondary side circuit 606 is coupled to one or more secondary windings of transformer 604. Primary side circuit 602 switches the input voltage received on input 514 across the primary winding(s) of transformer 604. Secondary side circuit 606 rectifies output induced on the secondary winding(s) of transformer 604 to provide a substantially DC output from converter 600. Isolated converter 600 may be any suitable isolated DC/DC power converter, including for example a push-pull converter, a full-bridge converter, a half-bridge converter, etc.

The secondary side circuit 602 includes an output rectifier (not shown in FIG. 6) to rectify the output from transformer 604. The output rectifier is an active forward mode rectifier. The active forward mode rectifier maintains the active current path and minimizes non-linearity due to magnetizing current flowing into the output. The active forward mode rectifier circuit simplifies the entire DC-DC Converter into a linear switch. The state space representation of the linear switch has only two states, on and off. Without the active forward mode rectifier, a number of quasi states exist, which introduces significant (e.g., orders of magnitude) non-linearity on the switch.

FIGS. 7-10 are diagrams of various active forward mode rectifiers 700, 800, 900, 1000 suitable for use in secondary side circuit 606. The active forward more rectifiers 700, 800, 900, 1000 shown in FIGS. 7-10 substantially minimize non-linear magnetizing energy from entering the output of the rectifier because an additional freewheeling diode (i.e., diode D3 in FIGS. 8-10, diodes D3 and D6 in FIG. 7) freewheels the inductor. Thus, the rectifier diodes (i.e., D1, D2, D4, and D5 only perform the rectification operation and there is very low utilization of the rectifier diodes during the freewheeling period.

Figure 11:
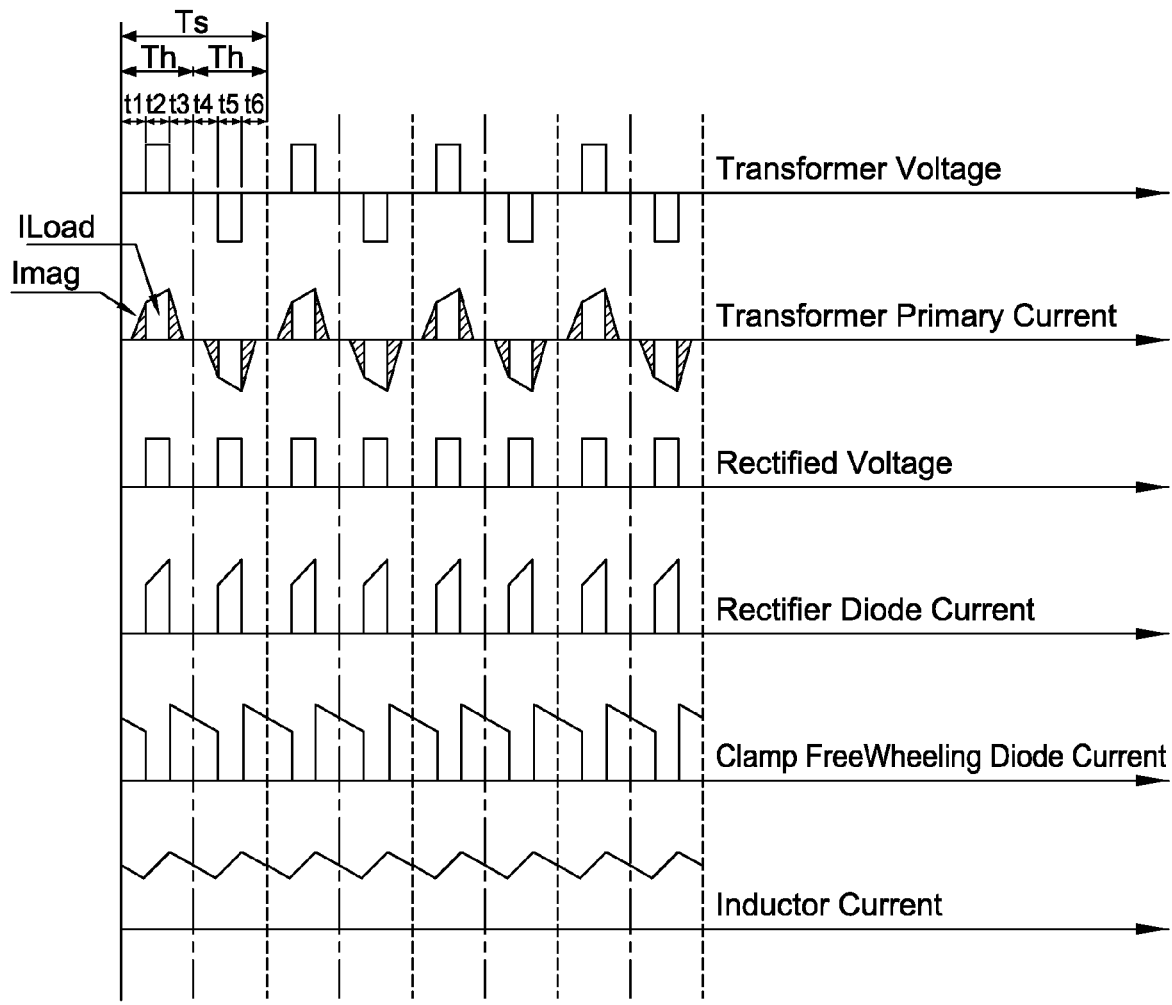
FIG. 11 is an operational waveforms of active forward mode rectifier.
Figure 12:
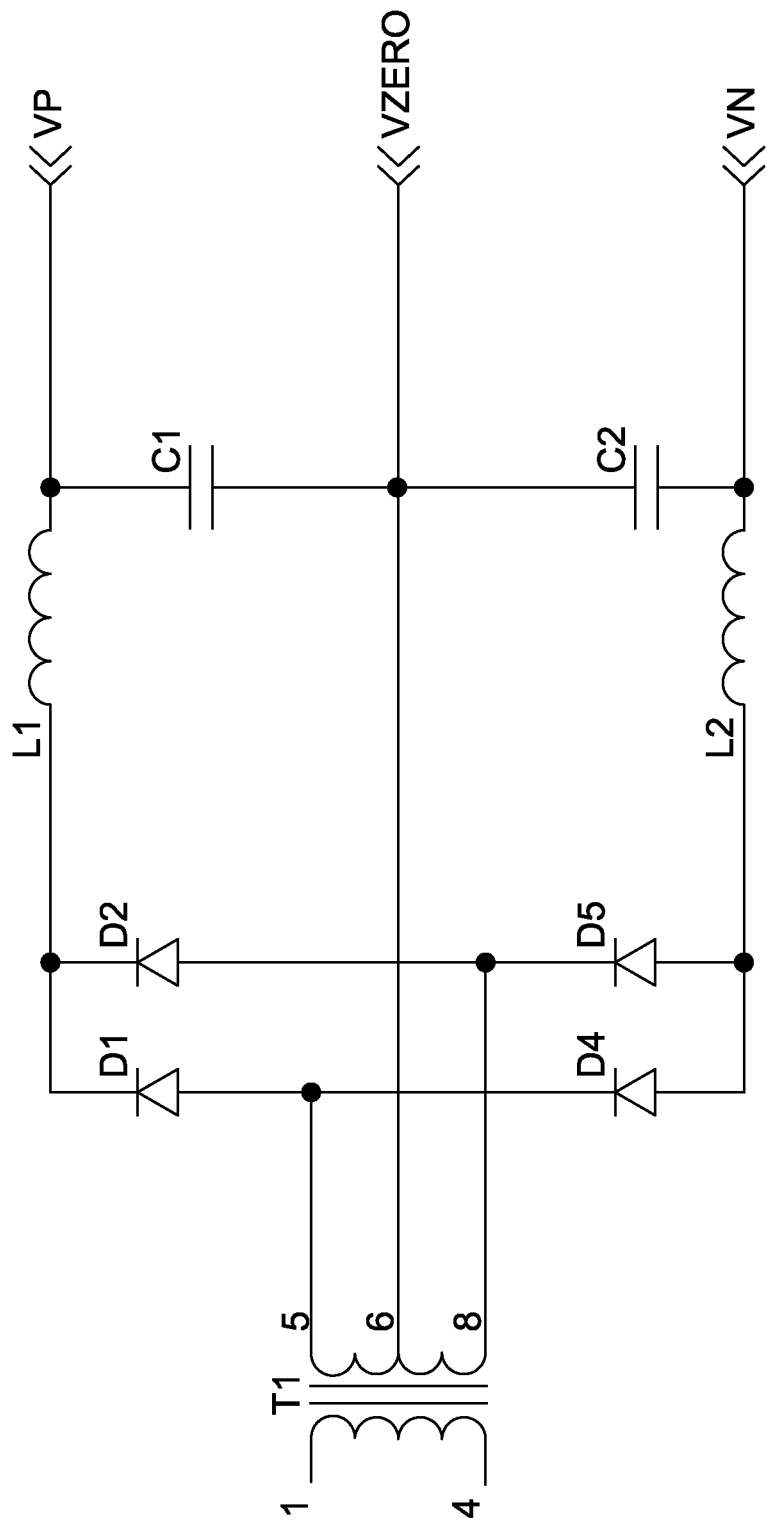
FIG. 12 is a center tapped full bridge bipolar output rectifier.
Figure 13:
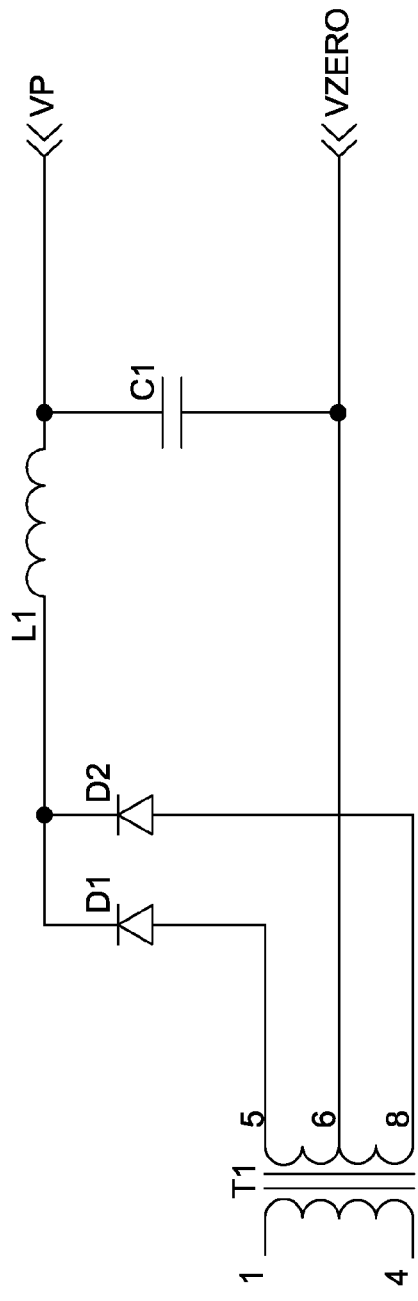
FIG. 13 is a center tapped full wave positive rectifier.
Figure 14:
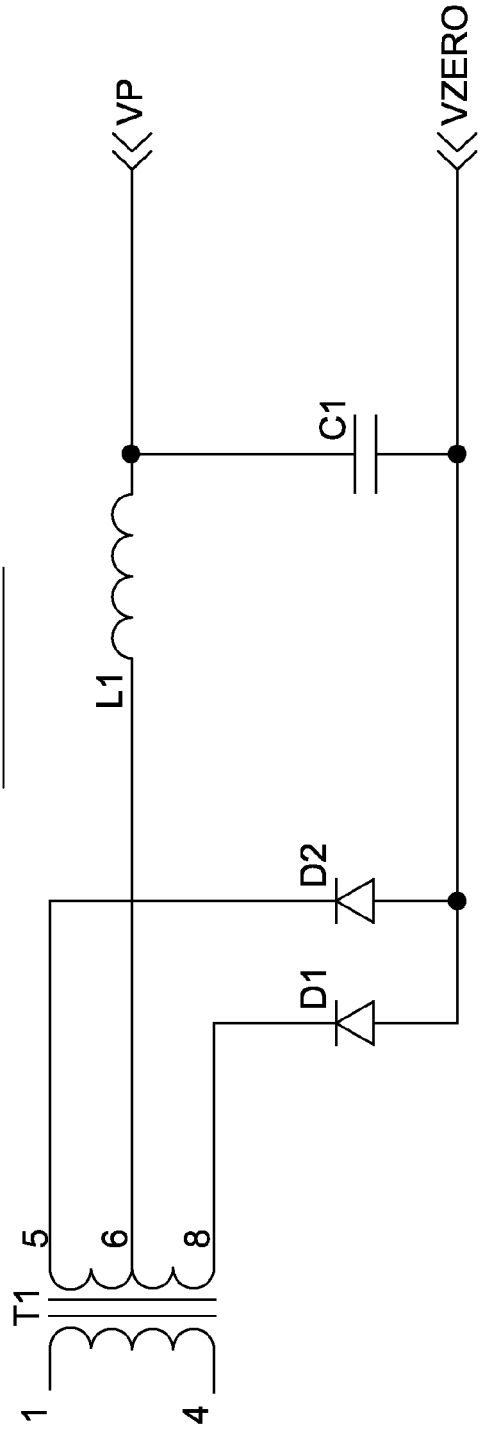
FIG. 14 is a center tapped full wave negatively clamped rectifier.
Figure 15:
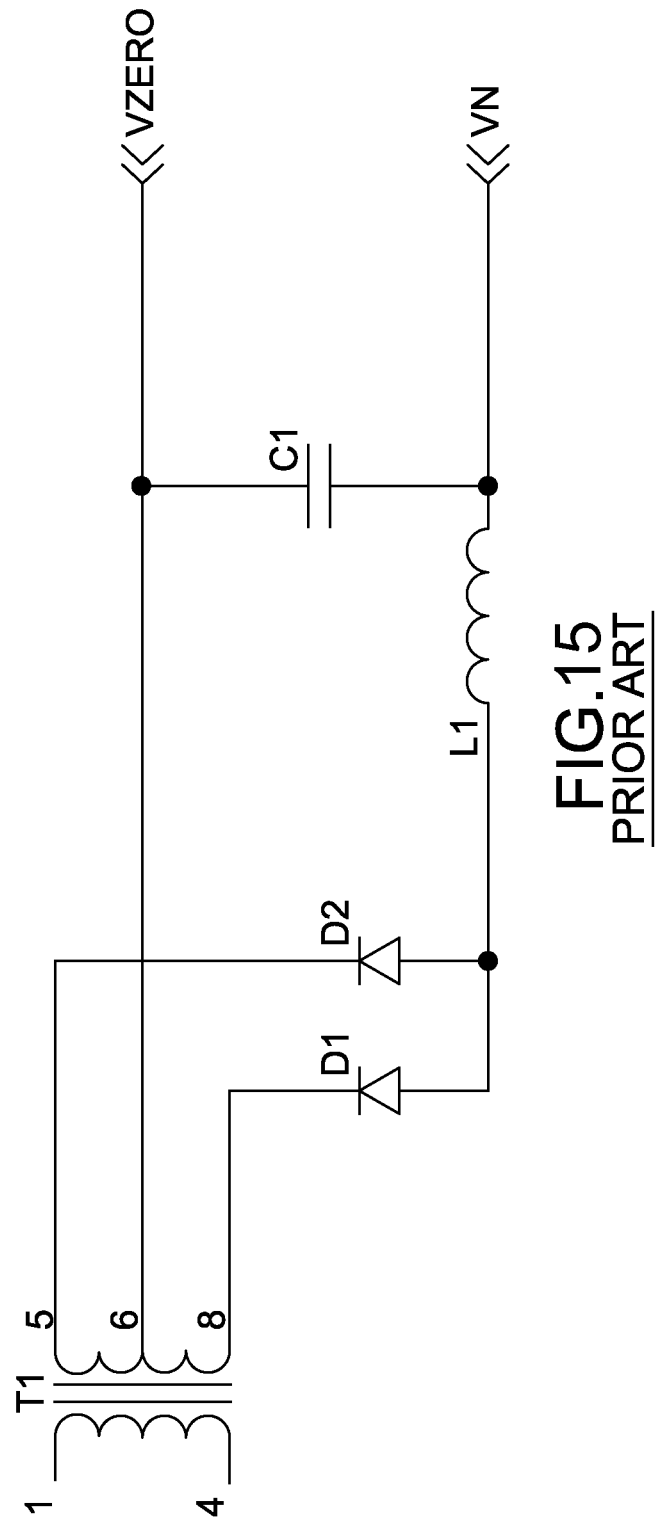
FIG. 15 is a center tapped full wave negative voltage rectifier.

FIG. 11 is a graph of operational waveforms of operation of an active forward mode rectifier (e.g., active forward mode rectifier 700, 800, 900, or 1000). For simplicity, the operation will be described with reference to the active forward mode rectifier 800 shown in FIG. 8. The transformer 604 primary current has a magnetizing non-linear current Imag and a load current Iload. If the magnetizing current is put on the secondary side of the transformer 604, the current becomes non-linear and predictability of the current is lost. The active forward mode rectifier 700, 800, 900, or 1000 blocks magnetizing current from entering the output by utilizing a low impedance path on the freewheeling clamping diodes.

The operation is broken into six cycles with description as given in the Table 1 below.

TABLE 1

| | |
|---|---|
| Ts | Full transformer Cycle |
| Th | Rectification Cycles |
| t1 | Transformer Pre Reset Cycle (Positive Primary wave) |
| t2 | Transformer Load Cycle (Positive Primary wave) |
| t3 | Transformer Post Reset Cycle (Positive Primary wave) |
| t4 | Transformer Pre Reset Cycle (Negative Primary wave) |
| t5 | Transformer Load Cycle (Negative Primary wave) |
| t6 | Transformer Post Reset Cycle (Negative Primary wave) |

The full transformer cycle Ts comprises two rectification half cycles Th, one for positive primary wave and one for negative primary wave. Periods t1, t2, t3, are identical in operation with t4, t5, t6.

During time periods t1 & t4, the transformer 604 primary side switches (in primary side section 504) free wheel and a predetermined magnetizing current Imag flows for a short period of time as shown in the shaded area of the transformer primary current waveform. Because the clamp diodes D3 are freewheeling during this period and sufficient current slope is not achieved for the rectifier diodes D1, D2 to conduct due to the impedance of the transformer 604, the magnetizing current is blocked by the rectifier diodes D1, D2 from passing on to the output.

During time periods t2 & t5, the transformer 604 primary side switches conduct. Load current ILoad flows because of the buildup of the transformer secondary voltage. The rectifier diodes D1, D2 conduct the current to the output. The clamp diodes D3 clamp the voltage at the input of the inductor L1 during this period and sufficient current slope is achieved for the rectifier diodes D1, D2 to conduct. The load current ILoad is blocked by the clamp diodes D3 from shorting the output.

During periods t3 & t6, the transformer 604 primary side switches free wheel and the load current falls but the magnetizing current Imag flows for a short period of time as shown in the shaded area of the transformer primary current waveform. Since the clamp diodes D3 start freewheeling during this period and sufficient current slope is not achieved for the rectifier diodes D1, D2 to conduct due to the impedance of the transformer 604, the magnetizing current IMag is blocked by the rectifier diodes D1, D2 from passing on to the output.

The methods and systems of the present disclosure provide active forward rectification for power converters. The exemplary active forward mode rectifiers maintains only the active current path and minimizes the non-linearity due to magnetizing current flowing into the output of the power converter. The active forward rectifier circuit simplifies the entire DC-DC Converter into a simple linear switch, making the state space representation of the switch only having two states (on and off) reducing the number of quasi-states in some other device that introduces non-linearity on other switches.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. A power converter comprising:
a transformer having a primary winding and a secondary winding;
a primary side circuit coupled to the primary winding, the primary side circuit configured to receive an input voltage and to switch the input voltage across the primary winding of the transformer; and
a secondary side circuit coupled to the secondary winding and configured to output a substantially direct current (DC) output, the secondary side circuit comprising an active forward mode rectifier and an output;
wherein the transformer secondary winding includes a first end, a second end, and a center tap;
wherein the active forward mode rectifier is coupled to the first end, the second end, and the center tap;
wherein the active forward mode rectifier comprises a first rectifier diode coupled to the first end of the secondary winding, a second rectifier diode coupled to the second end of the secondary winding, and a first clamp diode coupled to the center tap;
wherein the active forward mode rectifier comprises a third rectifier diode coupled to the first end of the secondary winding, a fourth rectifier diode coupled to the second end of the secondary winding, and a second free-wheeling diode coupled to the center tap; and
wherein the secondary side circuit further comprises a first output inductor having a first end and a second end and a second output inductor having a first end and a second end, and wherein the first rectifier diode, the second rectifier diode, and the first clamp diode are coupled to the first end of the first output inductor, and the third rectifier diode, the fourth rectifier diode, and the second clamp diode are coupled to the first end of the second output inductor.

2. The power converter of claim 1, wherein the secondary side circuit further comprises an output inductor having a first end and a second end, and wherein the first rectifier diode, the second rectifier diode, and the first clamp diode are coupled to the first end of the output inductor.

3. The power converter of claim 1, wherein the secondary side circuit further comprises an output line and an output inductor having a first end and a second end, wherein the first clamp diode is coupled to the first end of the output inductor, and the first rectifier diode and the second rectifier diode are coupled to the output line.

4. The power converter of claim 1, wherein the active forward mode rectifier is configured to substantially block a flow of a magnetizing current from the transformer to the output of the power converter.

5. The power converter of claim 1, wherein the active forward mode rectifier comprises a plurality of rectifier diodes, and wherein the active forward mode rectifier is configured to limit utilization of the plurality of rectifier diodes as freewheeling diodes.

6. A photovoltaic (PV) power system comprising:
a PV module; and
a power converter coupled to the PV module to receive an input voltage from the PV module, the power converter comprising
   a transformer having a primary winding and a secondary winding;
   a primary side circuit coupled to the primary winding, the primary side circuit configured to receive the input voltage and to switch the input voltage across the primary winding of the transformer; and
   a secondary side circuit coupled to the secondary winding and configured to output a substantially direct current (DC) output, the secondary side circuit comprising an active forward mode rectifier and an output;
   wherein the transformer secondary winding includes a first end, a second end, and a center tap;
   wherein the active forward mode rectifier is coupled to the first end, the second end, and the center tap;
   wherein the active forward mode rectifier comprises a first rectifier diode coupled to the first end of the secondary winding, a second rectifier diode coupled to the second end of the secondary winding, and a first clamp diode coupled to the center tap;
   wherein the active forward mode rectifier comprises a third rectifier diode coupled to the first end of the secondary winding, a fourth rectifier diode coupled to the second end of the secondary winding, and a second free-wheeling diode coupled to the center tap; and
   wherein the secondary side circuit further comprises a first output inductor having a first end and a second end and a second output inductor having a first end and a second end, and wherein the first rectifier diode, the second rectifier diode, and the first clamp diode are coupled to the first end of the first output inductor, and the third rectifier diode, the fourth rectifier diode, and the second clamp diode are coupled to the first end of the second output inductor.

7. The PV power system of claim 6, wherein the secondary side circuit further comprises an output inductor having a first end and a second end, and wherein the first rectifier diode, the second rectifier diode, and the first clamp diode are coupled to the first end of the output inductor.

8. The PV power system of claim 6, wherein the secondary side circuit further comprises an output line and an output inductor having a first end and a second end, wherein the first clamp diode is coupled to the first end of the output inductor, and the first rectifier diode and the second rectifier diode are coupled to the output line.

9. The PV power system of claim 6, wherein the active forward mode rectifier is configured to substantially block a flow of a magnetizing current from the transformer to the output of the power converter.

10. The PV power system of claim 6, wherein the active forward mode rectifier comprises a plurality of rectifier diodes, and wherein the active forward mode rectifier is configured to limit utilization of the plurality of rectifier diodes as freewheeling diodes.

* * * * *